April 30, 1963 J. L. GRAUMANN ET AL 3,087,533
DRYING APPARATUS AND METHOD
Filed Jan. 6, 1960 2 Sheets-Sheet 1

INVENTORS
JOHN L. GRAUMANN
ALFRED N. MAJOR
BY
Lindsey and Prutzman
ATTORNEYS

April 30, 1963    J. L. GRAUMANN ET AL    3,087,533
DRYING APPARATUS AND METHOD
Filed Jan. 6, 1960    2 Sheets-Sheet 2

INVENTORS
JOHN L. GRAUMANN
ALFRED N. MAJOR
BY
Lindsey and Prutzman
ATTORNEYS

United States Patent Office 3,087,533
Patented Apr. 30, 1963

3,087,533
DRYING APPARATUS AND METHOD
John L. Graumann, Glastonbury, and Alfred N. Major, Bristol, Conn., assignors to The Whitlock Manufacturing Company, West Hartford, Conn., a corporation of Connecticut
Filed Jan. 6, 1960, Ser. No. 887
8 Claims. (Cl. 159—13)

This invention relates to an apparatus and method for drying liquid compositions and, more particularly, to an apparatus and method of the type employing a falling film for drying ammonium nitrate solutions and slurries.

In the production of various chemical compounds and compositions, it is often desirable to free the product from water or other liquids and solvents more volatile than the chemical product. However, oftentimes the temperature at which the last few percent of water or other solvent will vaporize out of the solution closely approximates that at which decomposition of the product will occur. In other instances, evaporation and drying at atmospheric pressure proceed very slowly. In order to dry various liquid compositions of these types, extensive and generally expensive installations are presently utilized, including vacuum evaporators, cyclone dryers, and packed columns.

The problem of drying is especially significant in the production of ammonium nitrate compositions, which has become a major industry as a result of the demands for fertilizers, explosives and reagents. Generally, all the various commercial processes employ a reaction between nitric acid and ammonia, the resultant product being an aqueous solution of ammonium nitrate. Various methods have been proposed and employed in an effort to reduce the free water content to less than 0.5 percent by weight, which has generally considered as the optimum maximum in the production of substantially anhydrous and high-density prills. Although some of these methods have proven generally satisfactory, the cost and size of the equipment required, the costs of installation and/or operation, and/or the critical controls needed, have been a major concern in the industry, especially in view of the hazards in handling ammonium nitrate. Furthermore, long residence times at high temperatures often produce substantial decomposition of the ammonium nitrate leading to acidity in the product, which is particularly undesirable for storage and for prilling.

The term "ammonium nitrate solution" as used hereinafter refers to aqueous solutions of pure ammonium nitrate and of ammonium nitrate in combination with diluents, such as limestone and sulfates.

Limestone, both pure calcium carbonate and mixtures of calcium and magnesium carbonates, has been used widely as a diluent for ammonium nitrate in the production of fertilizers. Similarly, other mineral salts have been proposed as diluents, including sulfates and phosphates. Generally, the diluent is added to the aqueous reaction product in an amount sufficient to provide about 30 to 50 percent by weight of the dried product. In the case of limestone-ammonium nitrate mixtures, the combined water of the product may be disregarded, it being necessary only to reduce the free water content to less than 0.5 percent by weight.

It is an object of the present invention to provide a simple and effective apparatus for drying liquid compositions continuously or semi-continuously which utilizes a minimum of equipment and operates on the liquid composition at susbtantially atmospheric pressure.

It is also an object to provide a new and improved method for drying liquid compositions at substantially atmospheric pressure which utilizes a minimum of equipment and which enables close control of the operating conditions.

A specific object is to provide a single stage apparatus for drying ammonium nitrate solutions of 80 to 90 percent initial concentration to substantial dryness which is of greatly increased effectiveness, simple and durable construction, having a minimum of operating elements and a maximum of safety, and which is relatively short and compact.

A further specific object is to provide a simple and economical single-step method for drying ammonium nitrate solutions of 80 to 90 percent initial composition to substantial dryness with relatively short treatment times at atmospheric pressure and at temperatures below those at which appreciable decomposition takes place.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
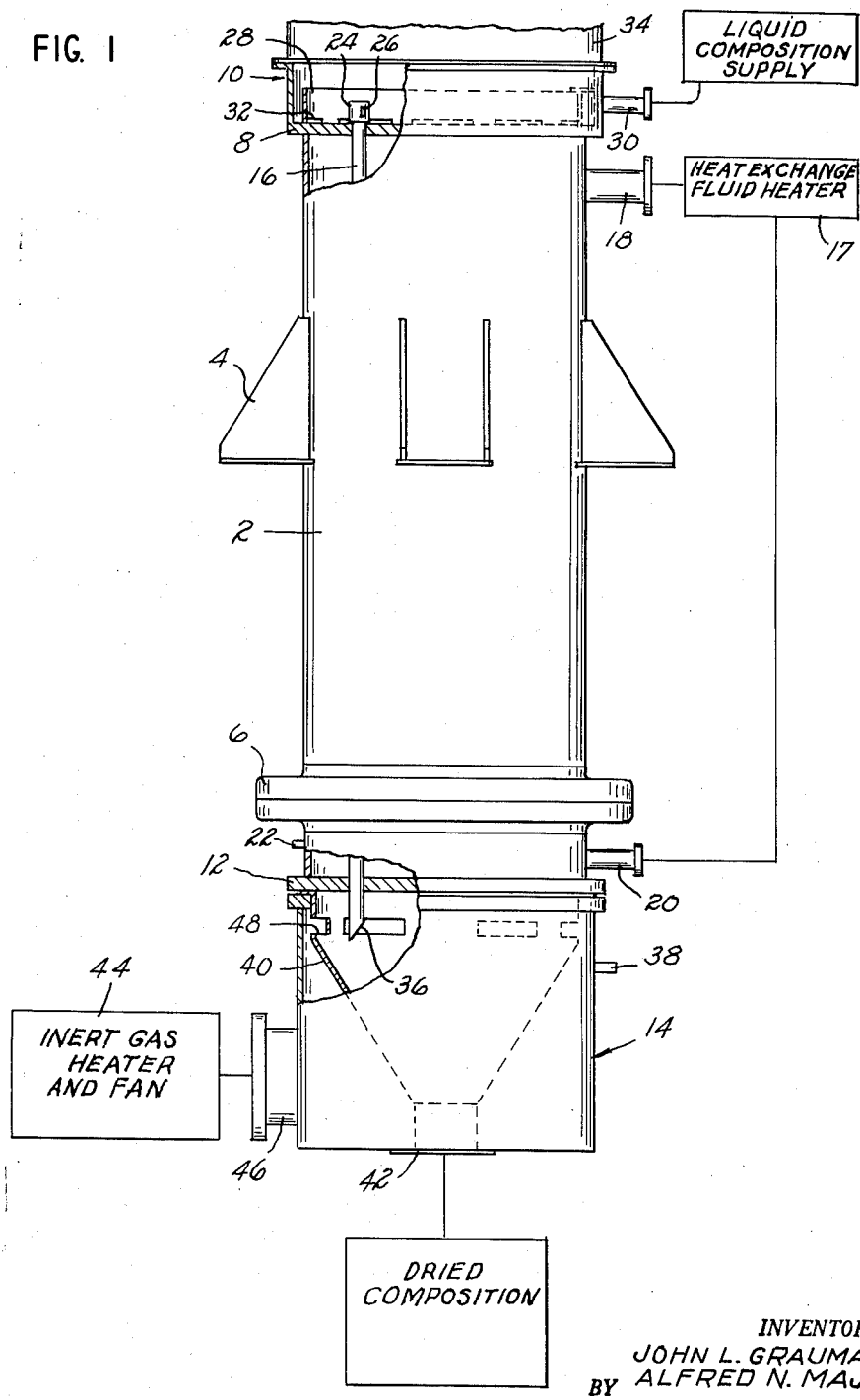
FIG. 1 is an elevational view of a drying apparatus embodying the present invention in partial section and with accessory equipment illustrated in diagrammatic form.

It has been found that the foregoing and related objects can be achieved by a method and apparatus in which the liquid composition is fed to a distributing chamber, is formed into a substantially uniform film on the interior surface of a tube, passes downwardly along the tube in heat-exchange with a heated fluid on the exterior of the tube and is raised to the desired temperature during its descent while in countercurrent contact with a stream of inert gas heated to a temperature on the order of the desired product temperature, the stream of gas having a linear velocity below that at which substantial entrainment will occur.

Referring to the attached drawings, therein illustrated is a falling film drying apparatus constructed in accordance with the present invention. The shell 2 is provided with several brackets 4 by which the apparatus is mounted in vertical position, and with an expansion member 6 adjacent the lower end to accommodate the differential expansion of the tubes and shell occurring during operaiton without stressing the assembly. Upper tube sheet 8 partitions the body of the shell from the distributing chamber 10 and lower tube sheet 12 similarly partitions the body of the shell from the plenum chamber 14.

A plurality of tubes 16 (only one of which is shown in the drawing for clarity) are supported in the tube sheets 8 and 12 and preferably extend therethrough for a purpose to be hereinafter more fully described. The tubes are most desirably secured in the tube sheets by expanding them into the metal of the tube sheets. Steam or other heat exchange fluid from the heater 17 is fed into the inlet 18 and passes downwardly through the shell 2 in contact with the exterior surfaces of tubes 16, and is discharged through the outlet 20. The shell 2 is also provided with an air vent 22 for discharging non-condensibles during start-up and during operation.

Figure 2:
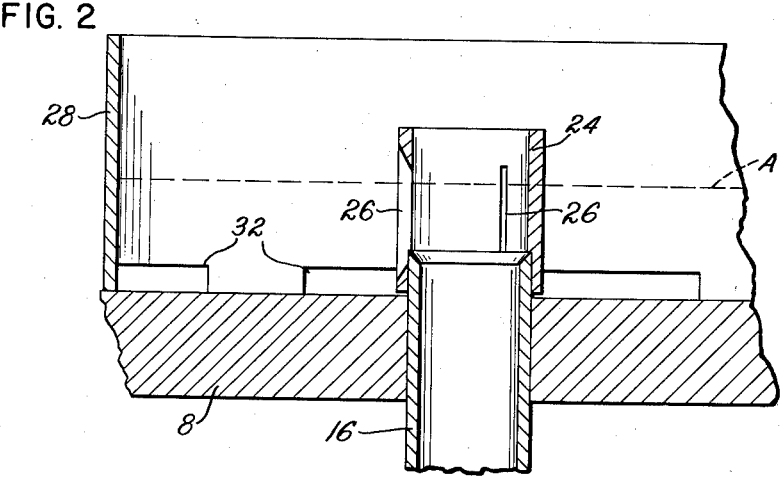
FIG. 2 is an enlarged fragmentary section of the distribution chamber in FIG. 1.
Figure 3:
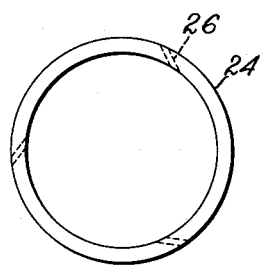
FIG. 3 is an enlarged plan view of the distributor ferrule with the slots in dotted line.

As more clearly shown in FIG. 2, the upper ends of the tubes 16 extend through the upper tube sheet 8 into the distributing chamber 10, wherein they are each provided with a tubular distributing ferrule 24 which seats around or over the outer periphery of the tube. As illustrated in FIGS. 2 and 3, the ferrule 24 is preferably provided with a plurality of axially extending slots 26 which are secantly disposed with respect to the axis of the ferrule. The slots 26 are spaced axially from the ends of the ferrule and define openings of substantially fixed dimensions. After seating the tubes 16 in the tube sheet 8, the projecting ends of the tubes are machined so that their upper ends are in a substantially uniform plane. The ferrules 24 also are preferably machined so as to provide a snug-fitting seat around the end of the tubes, and the ends of the tubes are disposed upwardly of the lower end of the slot, thus making the effective lower end of the slots uniform throughout the ferrules. The ends of the tubes are beveled to ensure smooth flow of the film of liquid composition from the ferrule onto the wall of the tubes.

The distributing chamber 10 is provided with a weir 28 spaced from the outer wall which surrounds the tubes and separates them from the liquid composition supply inlet 30. A plurality of apertures 32 spaced about the bottom of the weir 28 introduce the liquid composition into the tube portion of the chamber 10 below the surface level of the liquid composition, thus minimizing turbulence. The liquid level in the distributing chamber is maintained below the tops of the slots in the ferrules, preferably at the level indicated by the dotted line A in FIG. 2. In this manner, the liquid level will determine the upper end of the flow-through portion of the slots, and because the liquid level is substantially uniform in this baffled distribuiton chamber and the operative lower end of the slots is determined by the uniformly machined tube ends, a predetermined and substantially uniform amount of liquid composition will be introduced into each tube. Although the distribution chamber outer wall may be a continuation of the body of the shell, it is preferably a separate element for maximum utilization of the shell body and ease of manufacture, as illustrated in the drawings. An exhaust hood 34 is secured to the distribution chamber 10 for a purpose to be more fully described hereinafter.

Referring next to the lower end of the apparatus, the plenum chamber 14 is also preferably separately fabricated. As illustrated in FIG. 1, the tubes 16 project beyond the lower tube sheet 12 into the plenum chamber 14 and are provided with mitred end portions 36 to facilitate discharge of the falling film of liquid in a single stream. A thermowell 38 enables determination of the temperature of the discharge composition. A funnel-shaped member 40 collects the discharged liquid and channels it outwardly through the outlet 42 which communicates with the headbox of a processing unit, such as the spray equipment for a prilling tower.

Air or other inert gas of a predetermined temperature and velocity from the air heater 44 is introduced into the plenum chamber 14 through the inlet 46 and flows upwardly about the funnel-shaped member 40 and thence through the apertures 48 located adjacent and preferably slightly above the mitred ends 36 of the tubes 16 so that the incoming air will not substantially disrupt the stream of composition being discharged from the tubes. The preheated air or inert gas heats the funnel-shaped member 40 during its flow upwardly and provides a jacketed and heated discharge zone to prevent cooling of the discharged product.

In the operation of the apparatus, heat-exchange fluid, conveniently steam, is heated in the heater 17 and is supplied to the apparatus through the inlet 18, wherein it passes through the body of the shell in contact with the exterior surface of the tubes 16 and is then discharged through the outlet 20. The liquid composition to be dried is supplied to the outer portion of the distribution chamber 10 through the inlet 30, flows under the weir 28, and thence into the secantal slots 26 of the ferrules 24, which impart a circular motion to the entering film to ensure thorough distribution over the entire periphery of the interior surface. The film then descends gravitationally onto the beveled ends of the tubes 16 and continues its descent along the interior wall of the tubes unit it falls off the mitred bottom ends 36 of the tubes 16 onto the funnel-shaped member 40, and is discharged through the outlet 42.

Simultaneously, air or other gas inert to the composition is supplied from the air heater 44 at a temperature on the order of that ultimately desired in the film of liquid composition and at a velocity below that at which substantial entrainment will occur. The air enters the bottom of the tubes and passes upwardly therethrough in countercurrent contact with the falling film of liquid composition on the interior wall of the tubes. The air then passes out the upper ends of the tubes 16 and ferrules 24 and thence into the hood 34 wherein it is collected and lead off.

It will be readily apparent that the described arrangement of the machined tube ends and slotted ferrules, together, with control of the liquid level in the distribution chamber, provides a distribution system which substantially ensures entry of uniform and predetermined amounts of liquid composition into each ferrule and tube throughout the chamber. The secental slots have proven especially significant in obtaining uniform distribution of the entering composition about the entire periphery of the ferrules and tubes.

In constructing the apparatus of the present invention, those surfaces exposed to the chemical composition should be corrosion-resistant, such as stainless steel. Thus, in the illustrated apparatus, it is preferable to fabricate the tubes, tube sheets, weir, ferrules and funnel-shaped member of stainless steel, and at least the inside surfaces of the distribution chamber should be stainless steel.

The apparatus and method of the present invention have proven highly effective in the drying of ammonium nitrate solutions. In this use, the solution is fed into the distribution chamber at a temperature of about 220 to 280° F., and is heated to a temperature of about 350 to 400° F. Above 400° F. decomposition of the ammonium nitrate, and reaction between the limestone and ammonium nitrate when such compositions are treated, become substantial.

The heating of the film is most conveniently effected by use of steam at about 130 to 250 p.s.i.g. (355 to 406° F.). Generally, the film will be heated to a temperature about 3–5 degrees below that of the heat-exchange medium. The inert gas, most conveniently air, is heated to a temperature of about 300 to 400° F. and preferably about 340 to 360° F. The moisture content of the incoming gas stream does not appear to be significant at the dew points normally encountered in industrial operations, i.e., below about 85° F. The linear velocity of the air stream passing through the tubes should be kept below that at which substantial entrainment will occur, generally about 20 to 25 feet per second.

Although the time of passage through the tubes may be as long as 5 minutes, it is generally desirable to keep the hold-up time below 3 minutes, and preferably below ½ minutes to minimize decomposition.

It will be readily apparent that among the major advantages of the present apparatus and method are the minimum residence time at elevated temperatures and rapid throughput, enabling treatment of large volumes of solution with a relatively high degree of safety.

It has further been found that the surface area of the tubes and the mole ratio of inert gas to ammonium nitrate solution are of particular significance to successful practice of the invention, enabling the reduction of the free moisture content to below 0.5 percent, and into the preferable range of 0.2 to 0.4 percent, and even below, although at least about 0.1 percent by weight of free water appears necessary for satisfactory prilling.

For effective and practical operation, the tube diameter should be within the range of 1½ to 3 inches, (preferably about 2 inches) and the heated length should be about 10 to 25 feet. The mole ratio is particularly dependent upon the diameter of the tubes which will vary the amount of inert gas necessary to produce equivalent results, and will further vary with the ultimate temperature imparted to the film.

In practice, a 2-inch diameter tube has proven highly effective and consistent in operation. Table 1 is a compilation data obtained with a pilot plant unit comprised of a single 2-inch O.D. (12 B.W.G.) tube of 15 feet heated length, using Airochlor as a heat exchange fluid. In all cases, the ammonium nitrate solution contained no diluent salts.

TABLE 1

| Ammonium Nitrate Input | | Air Input | | | Heat exchange fluid Temp., °F. | Ammonium Nitrate Output | |
|---|---|---|---|---|---|---|---|
| Flow Rate, Gal./Min. | Concentration, percent by Weight | Flow Rate, s.c.f.m. | Dewpoint, °F. | Temp., °F. | | Concentration, percent by Weight | Temp., °F. |
| 0.22 | 83.5 | 0.0 | | | 376.5 | 97.38 | 370 |
| 0.21 | 83 | 2.3 | 56 | 351 | 376 | 99.28 | 371 |
| 0.206 | 83 | 4.0 | 46 | 345 | 359 | 99.25 | 352 |
| 0.19 | 83 | 4.0 | 45 | 355 | 376 | 99.7 | 371 |
| 0.23 | 83.5 | 5.0 | 50 | 322 | 357 | 99.4 | 354 |
| 0.19 | 83.5 | 10.0 | 46 | 301 | 357.5 | 99.66 | 352 |
| 0.21 | 83.5 | 14.2 | 49 | 333 | 375 | 99.77 | 371 |
| 0.21 | 84 | 14.0 | 7.5 | 329.6 | 374.6 | 99.82 | 369.8 |
| 0.17 | 85 | 14.0 | 83 | 314.5 | 377 | 99.82 | 373 |
| 0.24 | 84 | 14.0 | 67 | 312.5 | 353 | 99.64 | 350.7 |

Figure 4:
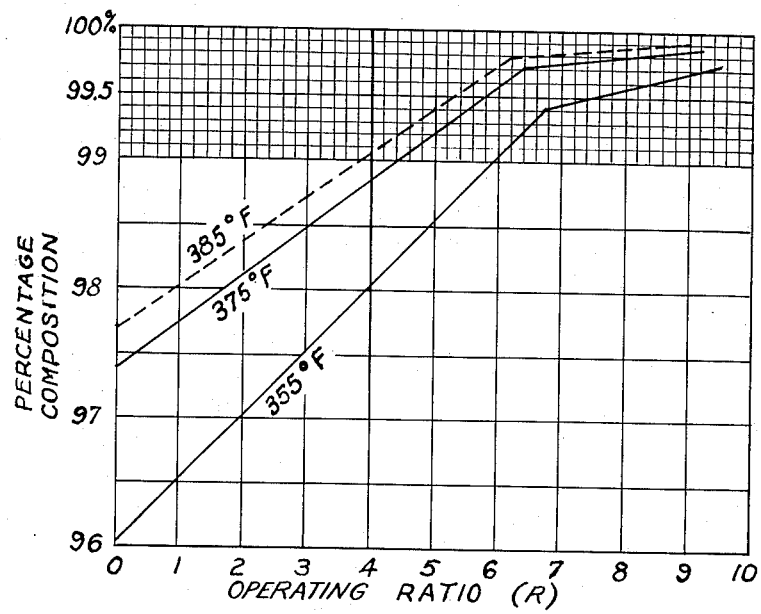
FIG. 4 is a graphic representation of critical relationships determined for the present invention.

It can be seen from Table 1 that several factors affect the satisfactory and optimum performance of the apparatus and method. FIG. 4 of the attached drawings is a graphic representation of data obtained on the heretofore described pilot unit using a 2-inch O.D. tube. The curves are a plot of percent composition (free water basis) against an operating ratio "R," which is an expression reflecting mole ratio and dimensions of the tube, at various heat exchange fluid temperatures. This ratio is expressed as:

$$R = \left(\frac{X^a}{Y^b}\right)L$$

wherein
$X$ = moles air per hour per foot of tube circumference.
$Y$ = moles ammonium nitrate per hour per foot of tube circumference.
$L$ = heated length of tube in feet.
$a$ = 0.415 at 355° F. heat-exchange fluid temperature 0.22 at 375° F. heat-exchange fluid temperature 0.20 at 385° F. heat-exchange fluid temperature.
$b$ = 0.87.

By use of the curves and operating ratio, a factor can be determined to compensate for known variations in one or more of the elements, enabling ready conversion of the unit to new operation conditions or to variations in length of tubes.

For example, with a preexisting evaporator unit having a fixed heated tube length, the flow rate of ammonium nitrate within the operating ratio (R) can be readily determined to produce a desired percentage of moisture in the ammonium nitrate output at a given temperature of heat exchange medium as plotted in FIGURE 4 of the attached drawings, or the temperature of the heat exchange medium and flow rate of air may be altered to produce an equivalent result while maintaining the same flow rate of ammonium nitrate. In the design of a new installation, the flow rate of ammonium nitrate may be set within limits to obtain optimum production, and the heated length of the tubes may be predetermined to provide operating capacity within the desired range of dryness for the ammonium nitrate output. Thus, by use of the curves in FIGURE 4 and the formula for the operating ratio (R), one or more factors may be readily determined to obtain the desired dryness while maintaining other factors at a constant or known value.

Particularly and specifically illustrative of the present invention are the following examples wherein ammonium nitrate compositions were effectively treated at high flow rates.

*Example One*

A commercial unit constructed in accordance with the present invention and substantially as illustrated in the attached drawings is comprised of thirty-six filming tubes of 16 feet heated length and 2-inch O.D. (12 B.W.G.) enclosed in a shell of about 20-inch diameter. Each tube is provided with a ferrule as illustrated having an axial length of about 2⅝ inches and three slots of about 3/64 inch width.

In accordance with the method of the present invention, approximately 83 percent ammonium nitrate solution was introduced into the distribution chamber at a temperature of about 240° F. Air was fed to the plenum chamber at a temperature of about 340° F. and at a rate of about 600 s.c.f.m. (about 19 s.c.f.m. per tube). Steam was fed to the inlet at about 160 p.s.i.g. (370° F.). The input rate of the ammonium nitrate was controlled to give a flow rate of about 7.2 gallons per minute (0.2 gallon per minute per tube), giving a total throughput of about 48 tons per day for this unit.

Analysis of ammonium nitrate discharged from the apparatus indicated it to be 99.7+ percent by weight, containing less than 0.3 percent by weight of water. The residence time in the tubes was determined as 0.53 minute.

*Example Two*

A pilot plant apparatus constructed in accordance with the present invention consisting of a single tube of 15 feet heated length, 2 inches O.D. (12 B.W.G.), was used for drying a slurry of ammonium nitrate and dolomite (a natural mixture of calcium carbonate and magnesium carbonate). The input slurry had the following analysis:

Percent by weight
Total water _____ 11
Ammonium nitrate _____ 54
Dolomite _____ 35

This slurry was fed into the unit at a temperature of about 235° F. and at a flow rate of about 2 pounds per minute. Air having a dew point of about 60° F. was heated to a temperature of about 318° F. and introduced into the unit at a rate of 10 s.c.f.m. Airochlor (an organic heat-exchange medium manufactured by the Monsanto Chemical Company) was used as the heat-exchange fluid and was introduced into the unit at a temperature of about 378° F.

The dolomite-ammonium nitrate mixture discharged from the apparatus was found to have a temperature of approximately 355° F. and was analyzed as having 0.20 percent by weight free water and 0.65 percent total water. The residence time in the tubes was determined as 0.5 minute.

As will be readily apparent from the foregoing description and examples, the apparatus and method of the present invention enable rapid and effective drying of liquid compositions in a single-stage operation and at atmospheric pressure. The apparatus is economical in construction and operation, provides uniform and trouble-free distribution, and controllable dryness. The method and apparatus have proven especially beneficial in the treatment of ammonium nitrate solutions wherein short residence times at elevated temperatures are most desirable for safety considerations and for product quality.

We claim:

1. A drying apparatus for a fluid composition comprising a vertical casing; an upper tube sheet in said casing defining a distribution chamber thereabove; a lower tube sheet in said casing; a bottom wall spaced from said lower tube sheet defining a plenum chamber therebetween; a plurality of heat-exchange tubes supported in said tube sheets and extending therethrough with their upper ends in a substantially common horizontal plane spaced above said upper tube sheet; a distributing ferrule seated around the upper end of each of said tubes in said distribtuion chamber, said ferrules having secantly disposed axially extending slots spaced about the periphery thereof, each of said slots extending from below the upper end of its associated tube and having its upper end spaced above said tube end to provide effective lower ends of said slots in substantial alignment; means for supplying a heated fluid to the casing between said tube sheets for heat exchange with said tubes; means for supplying fluid composition to said distribution chamber, said ferrules admitting controlled amounts of fluid composition to said tubes during operation to form a substantially uniform film on the inner peripheral surface thereof; means for supplying heated inert gas to said plenum chamber, the inert gas supplied to said plenum chamber passing upwardly through said tubes in counter-current contact with the film of fluid composition during operation thereof; an outlet adjacent the bottom wall of said plenum chamber for fluid composition discharged from said tubes; and an outlet in said distribution chamber for discharging inert gas passing upwardly through said tubes.

2. A drying apparatus for a fluid composition comprising a vertical casing; an upper tube sheet in said casing defining a distribution chamber thereabove; a lower tube sheet in said casing; a bottom wall spaced from said lower tube sheet defining a plenum chamber therebetween; a plurality of heat-exchange tubes supported in said tube sheets and extending therebeyond with their upper ends in a substantially common horizontal plane spaced above said upper tube sheet, the lower end of said tubes being mitred; a weir in said distribution chamber between the casing and heat-exchange tubes; means for supplying fluid composition to be dried to said distribution chamber, said weir having a plurality of apertures adjacent the bottom end thereof for admitting liquid composition below the liquid level; a tubular distributing ferrule seated around the upper end of each of said tubes in said distribution chamber, said ferrules having a plurality of secantly disposed axially extending slots spaced about the periphery thereof, each of said slots extending from below the upper end of its associated tube and having its upper end spaced above said tube end to provide effective lower ends of said slots in substantial alignment, said ferrules admitting controlled amounts of fluid composition to said tubes and forming a substantially uniform film on the inner peripheral surface during operation of the apparatus; means for supplying a heated fluid to said casing between said tube sheets for heat exchange with said tubes; means for supplying heated inert gas to said plenum chamber, the inert gas applied to said plenum chamber passing upwardly through said tubes in counter-current contact with the film of fluid composition during operation thereof; an outlet adjacent the bottom wall of said plenum chamber for fluid composition discharged from said tubes; a funnel-shaped member in said plenum chamber for collecting liquid composition falling from said tubes during operation and discharging said composition through the outlet in said plenum chamber, said funnel-shaped member having a plurality of apertures adjacent the ends of the tubes for passage of inert gas therethrough; and an outlet in said distribution chamber for discharging inert gas passing upwardly through said tubes and ferrules.

3. An apparatus for drying an 80.0 to 90.0 percent by weight ammonium nitrate solution to less than 0.5 percent by weight of free water comprising a vertical casing; an upper tube sheet in said casing defining a distribution chamber thereabove; a lower tube sheet in said casing spaced 10 to 25 feet from said upper tube sheet; a bottom wall spaced from said lower tube sheet defining a plenum chamber therebetween; a plurality of heat-exchange tubes supported in said tube sheets and extending therethrough, said tubes being 1½ to 3 inches in diameter and having their upper ends spaced above said upper tube sheet in a substantially common horizontal plane; a tubular distributing ferrule seated around the upper end of each of said tubes, said ferrules having a plurality of secantly disposed axially extending slots spaced about the periphery thereof, each of said slots extending from below the upper end of its associated tube and having its upper end spaced above the upper end of said tube to provide effective lower ends of said slots in substantial alignment; means for supplying a heat-exchange fluid to the casing between said tube sheets for heat-exchange with said tubes; means for supplying fluid composition to said distribution chamber, said ferrules admitting controlled amounts of fluid composition to said tubes during operation to form a substantially uniform film on the inner peripheral surface thereof; means for supplying heated inert gas to said plenum chamber, the inert gas supplied to said plenum chamber passing upwardly through said tubes in counter-current contact with the film of liquid composition during operation thereof; an outlet adjacent the bottom wall of said plenum chamber for fluid composition discharged from said tubes; and an outlet in said distribution chamber for discharging inert gas passing upwardly through said tubes.

4. In a drying apparatus of the type employing a falling film, the combination comprising a vertical shell; an upper tube sheet in said shell defining a distribution chamber thereabove; a plurality of heat-exchange tubes secured in and extending above said tube sheet, said tubes having their upper ends disposed in a substantially uniform horizontal plane spaced above said upper tube sheet; and a plurality of tubular distributor ferrules seated around the upper ends of said tubes, each of said ferrules having a plurality of secantly disposed axially extending slots each extending from below the upper end of its associated tube and having its upper end spaced above the upper end of said tube to permit entry of liquid therethrough and provide effective bottoms for said slots in substantial alignment, the surface of said ferrules adjacent said slots being free from projections, whereby liquid composition introduced into said distribution chamber and maintained at a liquid level below the tops of the slots in said ferrules will be conducted into the interior of said ferrules in a predetermined and controlled amount, the secantal slots imparting a circular motion to the conducted composition to ensure thorough distribution over the inner periphery of the ferrules and tubes.

5. The method for the drying of ammonium nitrate solutions in a single pass to a free moisture content of less than about 0.5 percent by weight comprising forming a substantially uniform film of ammonium nitrate solution having more than 10.0 percent by weight free water on the interior surface of an elongated vertically disposed tube having a diameter of about 1½ to 3 inches; contacting a heated fluid with the exterior of said tube over a distance of about 10 to 25 feet to raise the temperature of said solution to 350 to 400 degrees Fahrenheit prior to discharge from said tube; heating an inert gas to about 300 to 400 degrees Fahrenheit; and passing a stream of said heated inert gas upwardly through said tube in countercurrent contact with said film, said stream of gas having a lineal velocity below about 20 to 25 feet per second, said film being in contact with said tube and heated gas for a period sufficient to reduce the free moisture content of said solution to less than 0.5 percent by weight in a single pass and less than five minutes.

6. The method in accordance with claim 5 wherein said ammonium nitrate solution being dried has a free water content of 10.0 to 20.0 percent by weight and an initial temperature of about 220 to 280 degrees Fahrenheit.

7. The method in accordance with claim 6 wherein said film is in contact with said heated tube and heated gas for a period less than one and one-half minutes and wherein the temperature of the film upon discharge from said tube is about 370 to 375 degrees Fahrenheit, and the temperature of the heated inert gas is about 340 to 360 degrees Fahrenheit.

8. The method for the drying of ammonium nitrate solutions to a free water content of less than 0.5 percent by weight in a single pass comprising feeding ammonium nitrate solution to a distribution chamber at a temperature of about 220 to 280 degrees Fahrenheit and a free water content of 10.0 to 20.0 percent by weight; forming a substantially uniform film of said solution on the interior surface of a vertically disposed tube having a diameter of about 2 inches; contacting a heated fluid with the exterior of said tube over a length of 10 to 25 feet to raise said film to a temperature of 350 to 400 degrees Fahrenheit prior to discharge therefrom; heating an inert gas to a temperature of 300 to 400 degrees Fahrenheit; and passing said heated gas upwardly through said tube in counter-current contact with said film and at a linear velocity of below about 20 to 25 feet per second, said film being in contact with said heated tube and heated gas for a period of less than five minutes and having a free moisture content of less than 0.5 percent by weight upon discharge from said tube after a single pass therethrough, the flow rates for inert gas and ammonium nitrate and the path length of heated contact and heat-exchange fluid temperature being substantially interdefined by the curves in FIGURE 4 of the attached drawings for the desired percentage of moisture below about 0.5 percent by weight, the operating ratio (R) plotted in FIGURE 4 being:

$$R = \left(\frac{X^a}{Y^b}\right) L$$

wherein:

$X$ = moles air per hour per foot of tube circumference
$Y$ = moles ammonium nitrate per hour per foot of tube circumference
$L$ = heated path length of film travel in feet
$a$ = 0.415 at 355° F. heat exchange fluid temperature
0.22 at 375° F. heat exchange fluid temperature
0.20 at 385° F. heat exchange fluid temperature and
$b$ = 0.87.

References Cited in the file of this patent

UNITED STATES PATENTS

| | | |
|---|---|---|
| 568,615 | Haubtman | Sept. 29, 1896 |
| 971,258 | Dunn | Sept. 27, 1910 |
| 971,395 | Morris | Sept. 27, 1910 |
| 1,005,553 | Kestner | Oct. 10, 1911 |
| 1,323,013 | Christie | Nov. 25, 1919 |
| 2,089,945 | Converse et al. | Aug. 17, 1937 |
| 2,089,957 | Harris et al. | Aug. 17, 1937 |
| 2,096,748 | Kermer | Oct. 26, 1937 |
| 2,519,618 | Wilson et al. | Aug. 22, 1950 |

FOREIGN PATENTS

| | | |
|---|---|---|
| 64,623 | Denmark | July 15, 1946 |
| 112,651 | Sweden | Dec. 12, 1944 |
| 114,811 | Sweden | Sept. 11, 1945 |
| 1,162,894 | France | Sept. 18, 1958 |